(12) United States Patent
Koetter et al.

(10) Patent No.: US 6,279,938 B1
(45) Date of Patent: Aug. 28, 2001

(54) VEHICLE FRAME

(75) Inventors: Stefan Koetter, Mörfelden-Walldorf; Rainer Spitz, Eltville; José Manuel Algüera Gallego, Aschaffenburg; Siegfried Emmann, Weinstadt; Wolfgang Seidl, Marbach; Wolf-Rüdiger Barz, Waiblingen-Neustadt, all of (DE)

(73) Assignees: Jost Werke AG, Neu-Isenburg; Daimler Benz Aktiengesellschaft, Stuttgart, both of (DE)

( * ) Notice: Subject to any disclaimer, the term of this patent is extended or adjusted under 35 U.S.C. 154(b) by 0 days.

(21) Appl. No.: 09/162,276

(22) Filed: Sep. 29, 1998

(30) Foreign Application Priority Data

Sep. 30, 1997 (DE) .............................. 197 43 189

(51) Int. Cl.[7] ................................................. B62D 53/08
(52) U.S. Cl. ............................................... 280/438.1
(58) Field of Search ....................... 280/433, 438.1, 280/439, 440; 296/183

(56) References Cited

U.S. PATENT DOCUMENTS

| 2,100,463 | * 11/1937 | Wohlfarth . | |
| 2,618,488 | * 11/1952 | Ketel . | |
| 2,778,657 | 1/1957 | Chaplin . | |
| 4,418,934 | * 12/1983 | Mickey | 280/433 |
| 4,697,844 | 10/1987 | Giles . | |
| 5,163,700 | * 11/1992 | Loeber | 280/683 |
| 5,509,682 | * 4/1996 | Lindenmann et al. | 280/440 |
| 5,765,849 | * 6/1998 | Moulton et al. | 280/433 |

FOREIGN PATENT DOCUMENTS

| 25 37 929 | 3/1977 | (DE) . |
| 26 01 509 | 5/1978 | (DE) . |
| 35 23 742 | 5/1986 | (DE) . |
| 237 497 | 7/1986 | (DE) . |
| 43 22 716 | 1/1995 | (DE) . |

* cited by examiner

*Primary Examiner*—Paul N. Dickson
*Assistant Examiner*—Avraham H. Lerner
(74) *Attorney, Agent, or Firm*—Hudak & Shunk, Co. L.P.A.

(57) ABSTRACT

A vehicle frame which enables a lowering of the saddle coupling with improved stability for this, and recesses at the upper side of the lengthwise girders of the vehicle frame extending across the entire width of the frame are proposed. The saddle coupling is fastenably secured to the lengthwise girders.

10 Claims, 5 Drawing Sheets

VEHICLE FRAME

Figure 1:
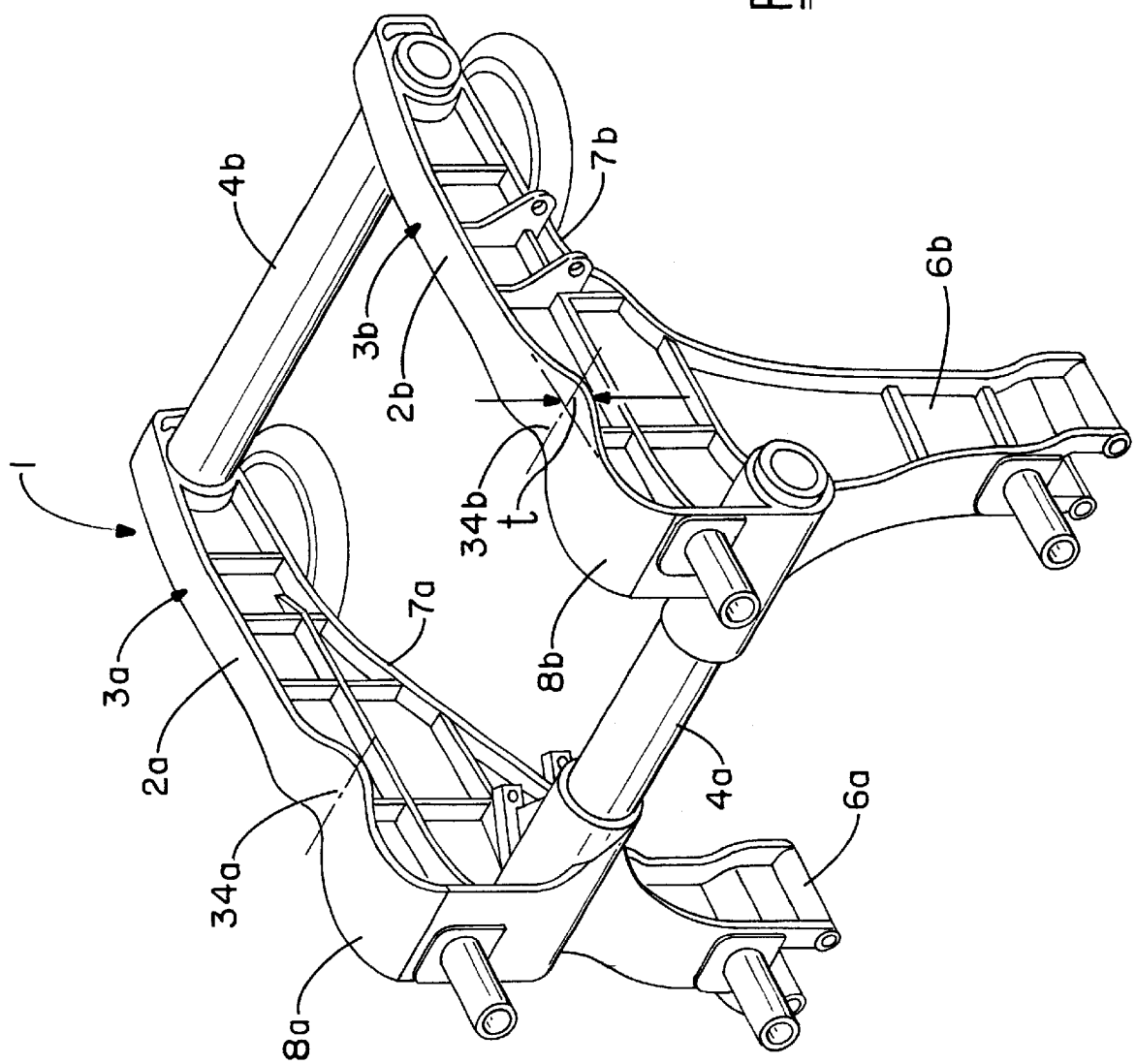

The invention concerns a vehicle frame, especially for utility vehicles, with two parallel lengthwise girders extending in the lengthwise direction of the vehicle and with means of fastening a saddle coupling onto the lengthwise girders.

In DE-OS 43 22 716 a vehicle frame is described, on which upwardly projecting bearing pedestals are formed, having a round bearing tube for bearing bolts to pass through. Separate bearing pedestals, which can be fastened to the vehicle frame, are known, for example, from DE-PS 26 01 509 or DE-OS 25 37 929.

The saddle coupling, which has corresponding openings to hold bearing bolts in the coupling plate, is first positioned relative to the bearing pedestals and then secured by means of the bearing bolts in the bearing pedestals. This assembly is time-consuming, because in particular the saddle coupling has to first be oriented exactly relative to the bearing pedestals.

Another problem is the manufacturing tolerances of the vehicle frame. The frame pieces on which the bearing pedestals are arranged can have different spacings, which causes problems during assembly and with respect to the stability of the saddle coupling.

Furthermore, the known bearing bushings have the disadvantage that the saddle coupling is positioned above the vehicle frame. In order to achieve the largest possible cargo volume for the trailers, an ever lower design height is desirable, so the saddle coupling must also be positioned as low as possible in the frame. The known bearing pedestals go counter to this trend. Upwardly projecting bearing pedestals must be extremely solid because they are sometimes loaded simultaneously in all three directions in space. Bearing pedestals of such a rigid design also increase the vehicle's weight.

There is a known bearing fixation and shift prevention for saddle plates from DD 237 497 A 1. On the assembly plate for the saddle coupling there are projections in the form of knobs which engage with corresponding indentations in the bearing surface of the undercarriage. These are closed depressions, in order to prevent shifting in all directions. Manufacturing tolerances can only be equalized to some extent, while different spacings between the lengthwise girders cannot be compensated. The installation height of the saddle coupling is not affected by these measures.

In order to lower the saddle coupling, DE-PS 35 23 742 proposes shifting the linkage point of the saddle coupling at the rear behind the rear rigid beam axle of the tractor and having the vehicle frame downwardly cranked at the rear. However, a plate which is mounted on the frame is used for the fastening so that the swivel axis lies above the cranked frame and, thus, the advantages of the lowering of the saddle coupling are not fully exploited. Because of the rearward shifted arrangement of the saddle coupling, this solution also comes at the cost of the vehicle's length.

A vehicle frame is known from U.S. Pat. No. 4,697,844 that allows a lowering of the saddle coupling in any desired location of the vehicle frame. A traditional U-shaped frame is first reduced in height. In order to compensate for the consequent weakening of the frame, however, several stiffening plates and supporting profiles are needed, so that sufficient stability may be provided for the reduced cross section.

The purpose of the invention is to create a vehicle frame which, with improved stability, enables the saddle coupling to be lowered.

This purpose is achieved with a vehicle frame in which the fastening means comprise recesses situated in the upper side of the lengthwise girders, extending across the entire width of the frame, and at least one holding element which is removably fastened to each lengthwise girder.

Advantageous configurations shall be described in the subsidiary claims.

The invention starts with traditional lengthwise girders which are used in vehicles, especially utility vehicles, and which accordingly possess great stability for absorbing the forces transmitted by the saddle coupling. Such lengthwise girders, at the place where the saddle coupling is to be mounted, are modified only in a short segment at the upper side by a recess extending across the width of the frame, so that the stability of the lengthwise girder is not affected. These recesses are open at the sides of the particular lengthwise girder, so that the fastening means provided on the saddle coupling, such as pivot pins, can be adjusted in the transverse direction of the lengthwise girder to equalize manufacturing tolerances with respect to the spacing of the lengthwise girders. If the spacing of the lengthwise girders is too narrow, the fastening means can stick out to the side beyond the recess. The configuration of the frame according to the invention allows direct mounting of the saddle coupling without an additional mounting plate.

The recesses can be made in the lengthwise girders by a shaping process or during a casting process, in particular, a die-casting process.

The shape of the recesses is adapted to the fastening means arranged on the saddle coupling, preferably selecting a round contour in cross section, in particular, a circular or elliptical one. A contour with corners is also possible.

For example, when a saddle coupling has outwardly projecting pins as the fastening means, the shape of the recess is adapted to the form of such fastening pins or bearings to accommodate the pins.

Any desired lowering of the saddle coupling can be achieved in terms of the depth of the recess, which is only limited by the configuration of the frame and its stability. Thus, the saddle coupling can be shifted so far down that, in the extreme case, it projects only slightly above the upper side of the lengthwise girders so that the lengthwise girders do not interfere with the movement of the trailer. Thus, optimal utilization of space can be achieved, wherein the depth of the recesses has to be adapted to the particular structural shape and, in particular, to the fastening means arranged on the saddle couplings.

When mounting the saddle coupling, it is lowered from above onto the frame, so that the fastening means, such as the pins, can engage with the recesses. Next, using at least one holding element, the fastening means and thus the entire saddle coupling are fixed to the vehicle frame.

The recesses facilitate the mounting of the saddle coupling in that the saddle coupling adjusts itself as it is lowered. Manufacturing tolerances of the vehicle frame, such as might be manifested by different girder spacings, do not affect the assembly, since deviations in the horizontal direction can be equalized by the fastening means arranged on the saddle coupling in conjunction with the open recesses. Therefore, the frame according to the invention enables assembly time to be shortened significantly.

A further advantage of the frame is that the forces coming from the saddle coupling are channeled directly into the lengthwise girders, so that the stability of the frame can be fully utilized.

The attachment component can preferably be a bracket, a half-bracket, or a bearing cap. A bearing cap of this kind is a cup-like structural element whose inner contour is adapted to the shape of the attachment component positioned on the saddle coupling and which is placed on the component before mounting the saddle coupling. The outer contour of the bearing cap is adapted to the shape of the recesses.

After lowering the saddle coupling, it is only necessary to secure the previously mounted bearing cap on the respective lengthwise girder.

Preferably, a bushing with a spherical surface is inserted in the bearing cap.

Figure 2:
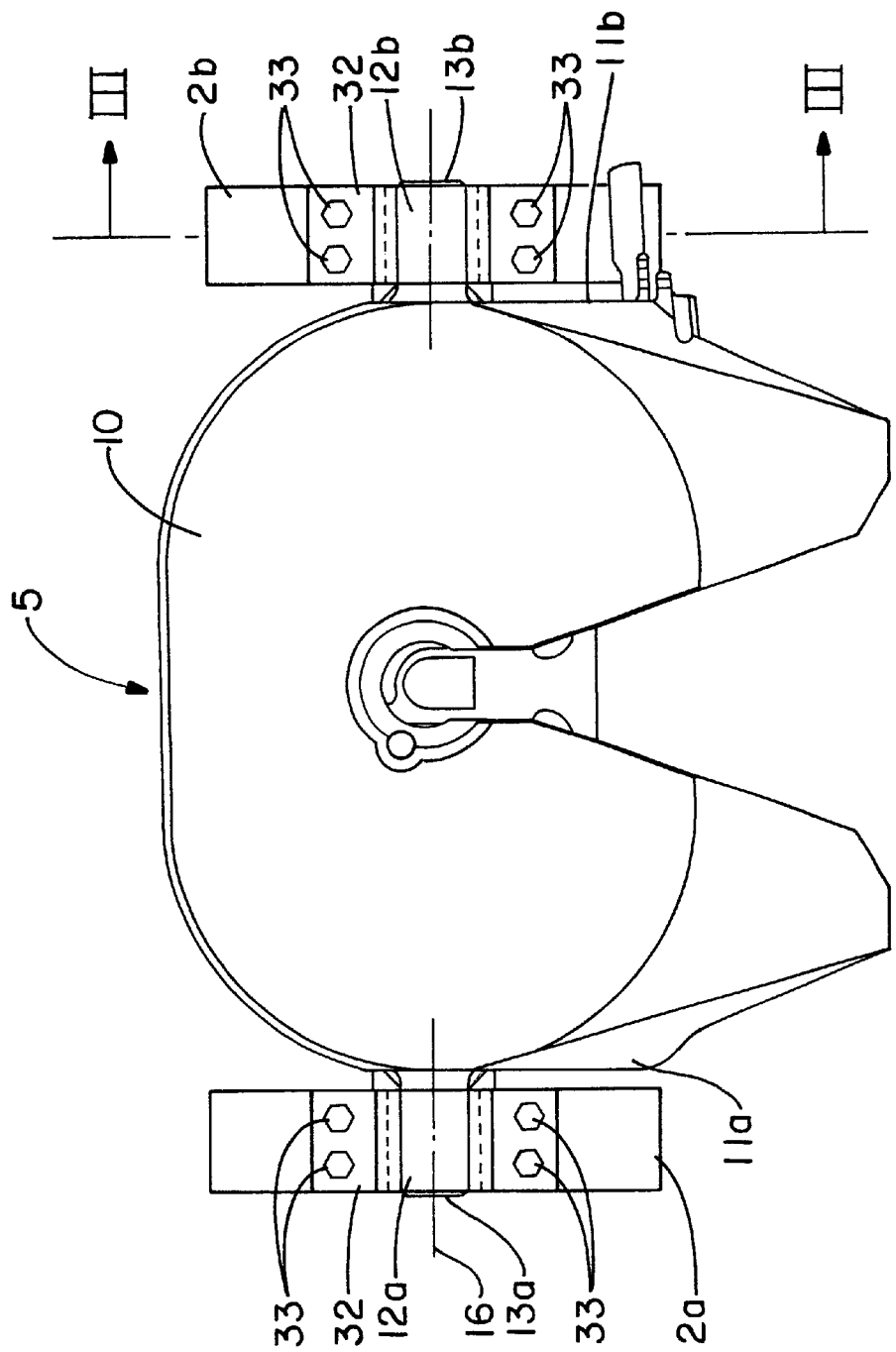
Figure 3:
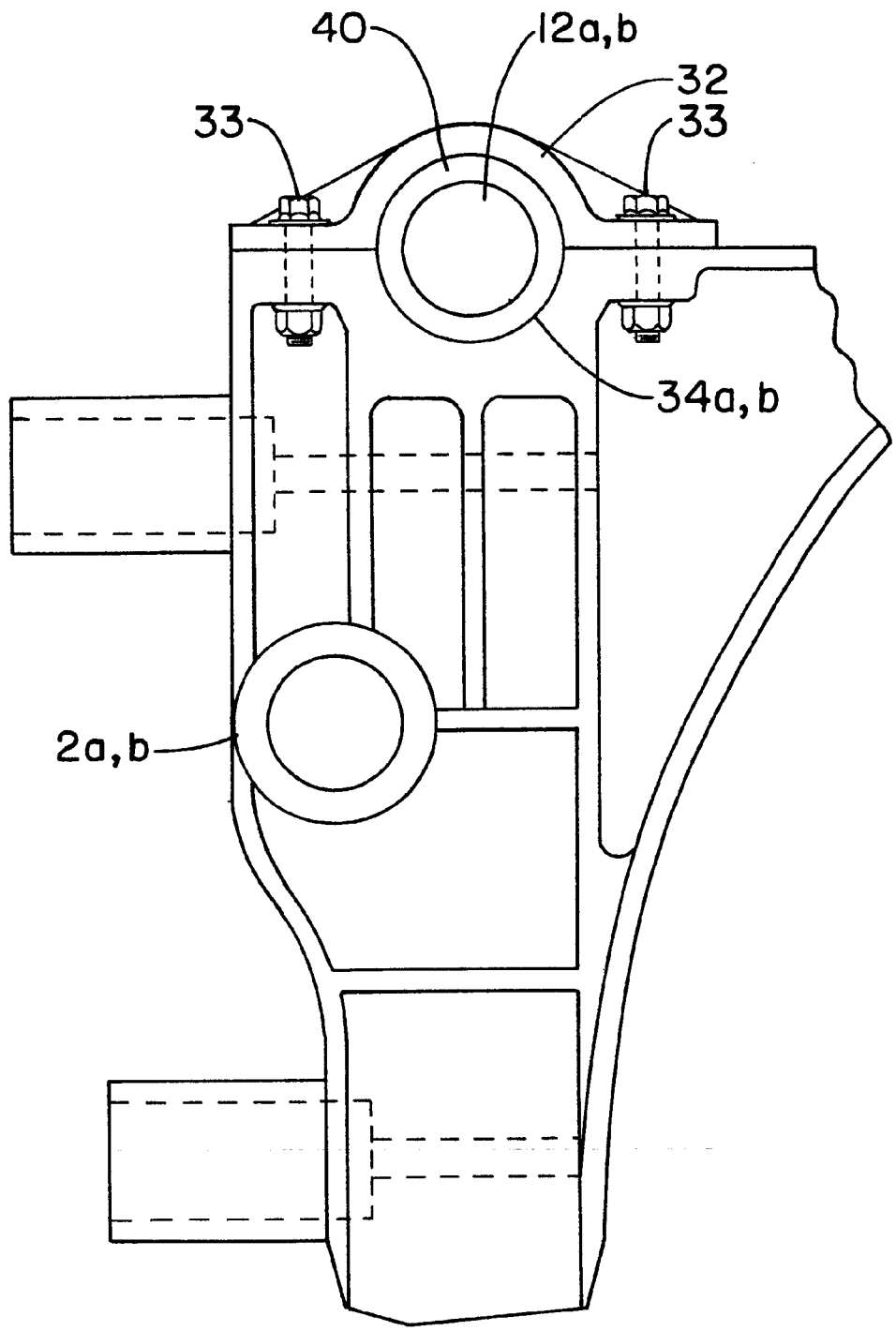
Figure 4:
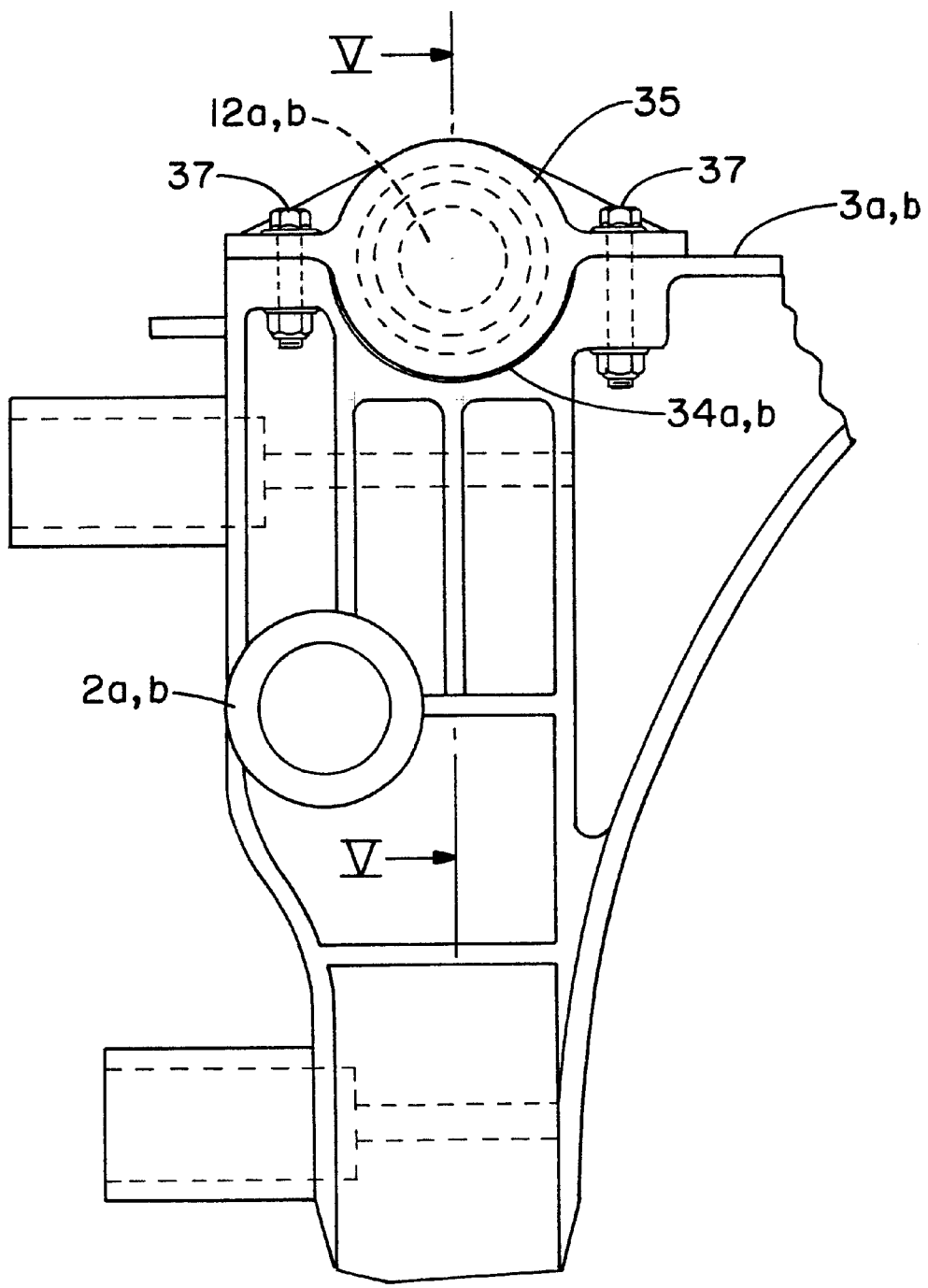

Sample embodiments of the invention shall now be explained more closely by means of the drawings. These show:

FIG. 1, a perspective view of the rear axle frame,

FIG. 2, a top view of the frame shown in FIG. 1 with saddle coupling in place,

FIG. 3, a cross section along line III—III through the bearing shown in FIG. 2,

FIG. 4, a side view of a bearing with a bearing cap, and

Figure 5:
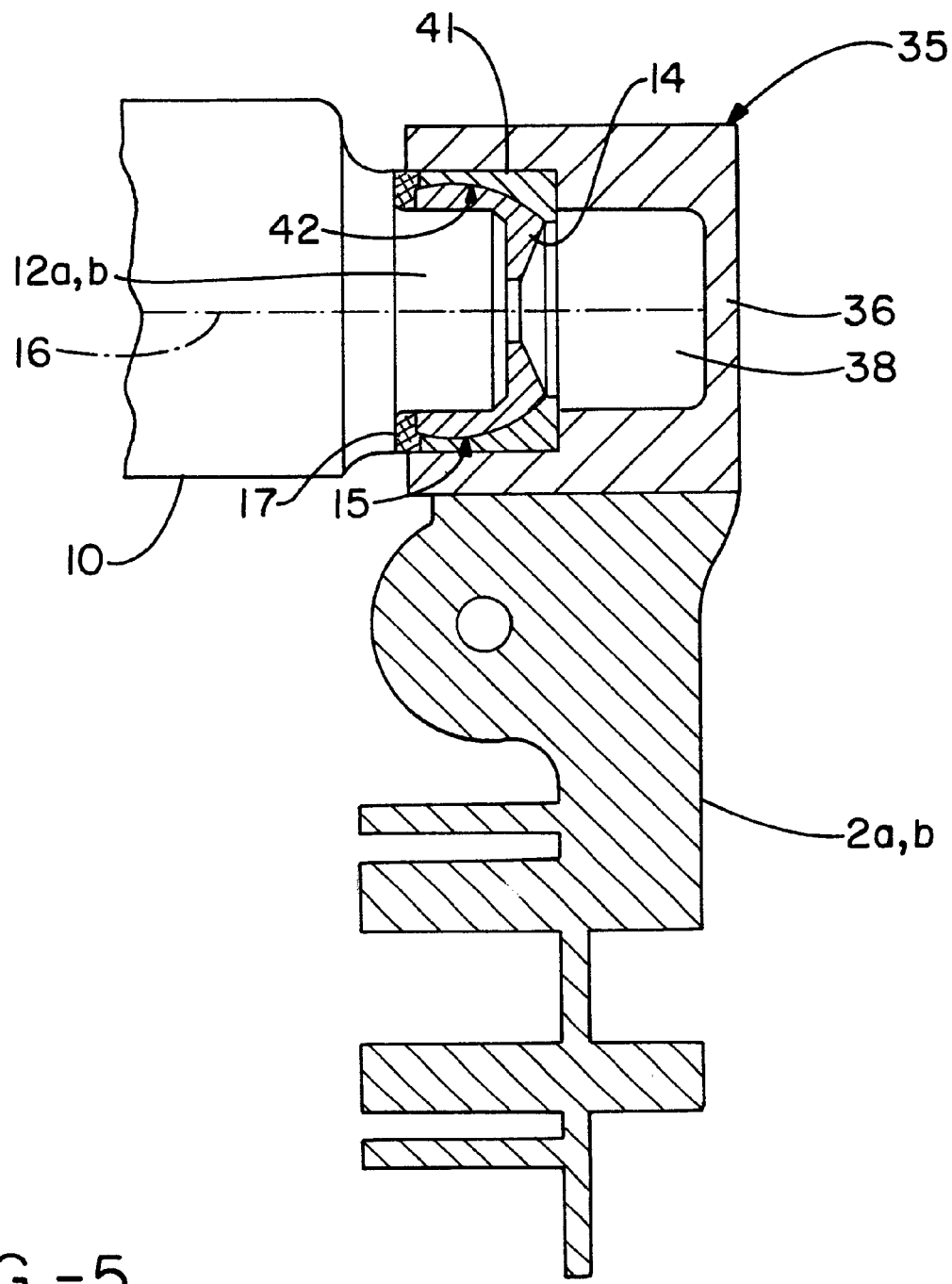

FIG. 5, a cross section along line V—V through the bearing cap shown in FIG. 4.

FIG. 1 shows a perspective view of a vehicle frame 1, the load bearing components of which in the region of the rear axle are formed by the rear side lengthwise girders 2a, b, joined to each other by cross girders 4a, b. The lengthwise girders 2a, b are fabricated as forged or die-cast parts, preferably from a light metal. In side view, the lengthwise girders 2a, b are L-shaped with legs 6a, b and 7a, b, and the leg 6a, b extending in the vertical direction allows simple fastening of the longitudinal control arm in its seat, on the one hand, and a vertical spacing of the structural parts taking over the function of the lengthwise girder, on the other.

Between the horizontal legs 7a, b of the lengthwise girder 2a, b there is an open space to accommodate a saddle coupling. In order to fasten the saddle coupling (not shown), the horizontal legs 7a, b of the lengthwise girders 2a, b have a recess 34a, b on opposite sides, which has a semicircular shape in the embodiment shown here. The frame plate 8a, b at the upper side of the lengthwise girders 2a, b is downwardly drawn or downwardly deformed in order to fashion the recesses 34a, b.

The depth of the recess 34a, b is adapted to the structural shape of the saddle coupling or to the fastening means arranged on the saddle coupling. The depth t is relatively less than the thickness of the frame, so that the stability of the lengthwise girders 2a, b is not impaired by the recesses 34a, b. A further advantage is that the recesses 34a, b in the configuration shown here are arranged in the region of the vertical leg 6a, b, so that the recesses 34a, b are located in an especially stable region of the lengthwise girders 2a, b.

FIG. 2 shows a top view of the vehicle frame of FIG. 1 with saddle coupling installed. The saddle coupling 5, of which basically the coupling plate 10 is shown, is a traditional saddle coupling and not a subject of the invention, so that it need not be described in detail.

The saddle coupling 5 has outwardly projecting pivot pins 12a, b at the two opposite side surfaces 11a, b, being shown as cylindrical in the embodiment here. The pivot pins 12a, b when assembled, as shown partially in FIG. 3, engage in the recess 34a, b, whose contour is adapted to the shape of the pivot pins 12a, b. Using a half-bracket 32 and the screws 33, the pivot pins 12a, b are fastened on the lengthwise girders 2a, b. To allow the saddle coupling 5 to swivel during operation about its horizontal axis without major effort, the pivot pins 12a, b are additionally provided with a bushing 40. This bushing can preferably consist of a plastic material having especially good sliding properties. Preferably, bushing material and pivot material are adapted to each other in respect of a good sliding fit. Manufacturing tolerances can be equalized by the bushing, depending on the choice of material.

The length of the pivot pins 12a, b is adapted to the width of the lengthwise girders 2a, b and, thus, to the length of the recesses 34a, b. In FIG. 2, the pivot pins 12a, b project slightly outward with their end surfaces 13a, b relative to the outside of the lengthwise girders 2a, b. Manufacturing tolerances, such as different spacings of the lengthwise girders 2a, b, are equalized by the pivot pins 12a, b in that they need not lie across the entire length of the recesses 34a, b.

FIG. 4 shows another embodiment of the bearing. The recesses 34a, b in the lengthwise girders 2a, b are again semicircular in shape. Contrary to the embodiment of FIGS. 1–3, the bearing pin or the bushing placed on the bearing pin does not lie directly in the recess 34a, b, but instead there is provided a bearing cap 35, whose outer contour is adapted to the shape of the recesses 34a, b. The bearing cap 35 is fastened by means of screws 37 to the upper side 3a, b of the lengthwise girders 2a, b.

FIG. 5 shows a section along line V—V through the representation of FIG. 4. Only the pivot pin 12a, b of the saddle coupling 5 is represented. On the cylindrical pivot pin 12a, b there is an extruded part 14 with a spherical outer surface. Inside the bearing cap 35 there is a bushing 41 with a spherical inner surface 42 adapted to the extruded part. These spherical surfaces make it possible to equalize manufacturing tolerances, and a plastic material such as polyoxymethylene is preferably used for the bushing. A seal 17 is provided to prevent grime from getting into the bearing.

The arrangement of bearing cap 35 and pivot pin 12a, b shown in FIG. 5 is chosen such that the end surface 13a, b does not lie against the end wall 36 of the bearing cap 35, so that the swivel movement of the saddle coupling 5 about the horizontal axis 16 is not hindered. Instead, in the embodiment shown, there is an additional clearance 38 which can be used to accommodate an appropriately configured pivot pin.

What is claimed is:

1. A frame for a vehicle, comprising:

two parallel lengthwise girders adapted to extend in the lengthwise direction of the vehicle, said girders adapted to be structural supporting members of said vehicle frame and support loads in addition to a saddle coupling, said girders being free of an upwardly projecting mounting plate or bearing pedestal to support said saddle coupling;

integral recesses in the lengthwise girders adapted for fastening a saddle coupling thereto, said integral recesses located on the upper side of the lengthwise girders extending across the entire width of the frame; and at least one holding element which is removably fastened to each lengthwise girder.

2. The vehicle frame according to claim 1, wherein said recesses are made in the lengthwise girders by a shaping process.

3. The vehicle frame according to claim 1, wherein said recesses are are made in the lengthwise girders during a casting process.

4. The vehicle frame according to claim 1, wherein said recesses have a round contour in cross section.

5. The vehicle frame according to claim 4, wherein said recesses have a circular or elliptical cross section.

6. The vehicle frame according to claim 1, wherein said holding element is a bracket.

7. The vehicle frame according to claim 4, wherein said holding element is a bracket.

8. The vehicle frame according to claim 1, wherein said holding element is a bearing cap, said bearing cap having an inner contour and an outer contour, said bearing cap adapted to grip a pivot pin of a saddle coupling.

9. The vehicle frame according to claim 8, wherein said inner contour of the bearing cap is adapted to this shape of the pivot pin and the outer contour to the shape of the recess.

10. The vehicle frame according to claim 9, wherein a bushing with a spherical surface is placed in the bearing cap.

* * * * *